June 6, 1961  H. BECKMANN  2,987,404
METHOD OF CONSERVING FRESH FISH
Filed April 11, 1957  2 Sheets-Sheet 2
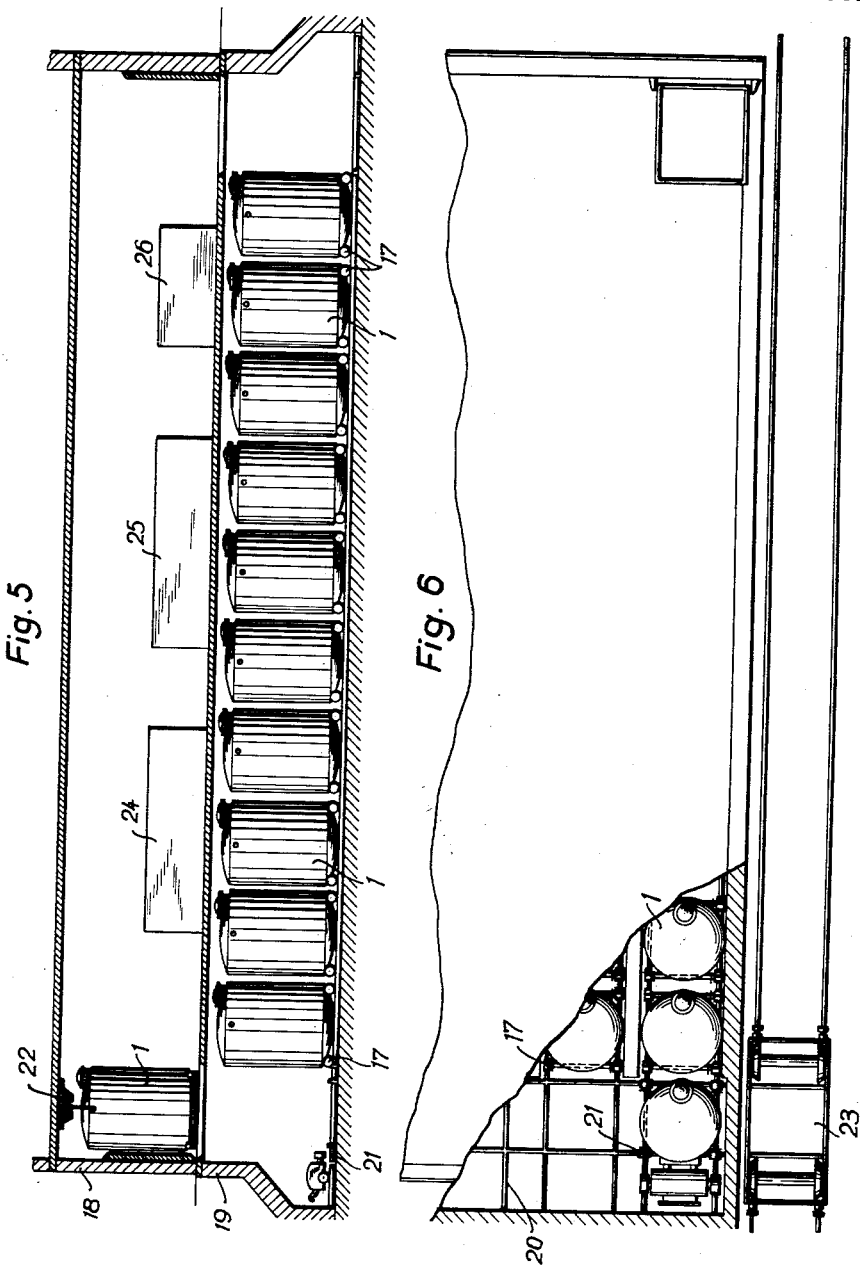
INVENTOR
HANS BECKMANN

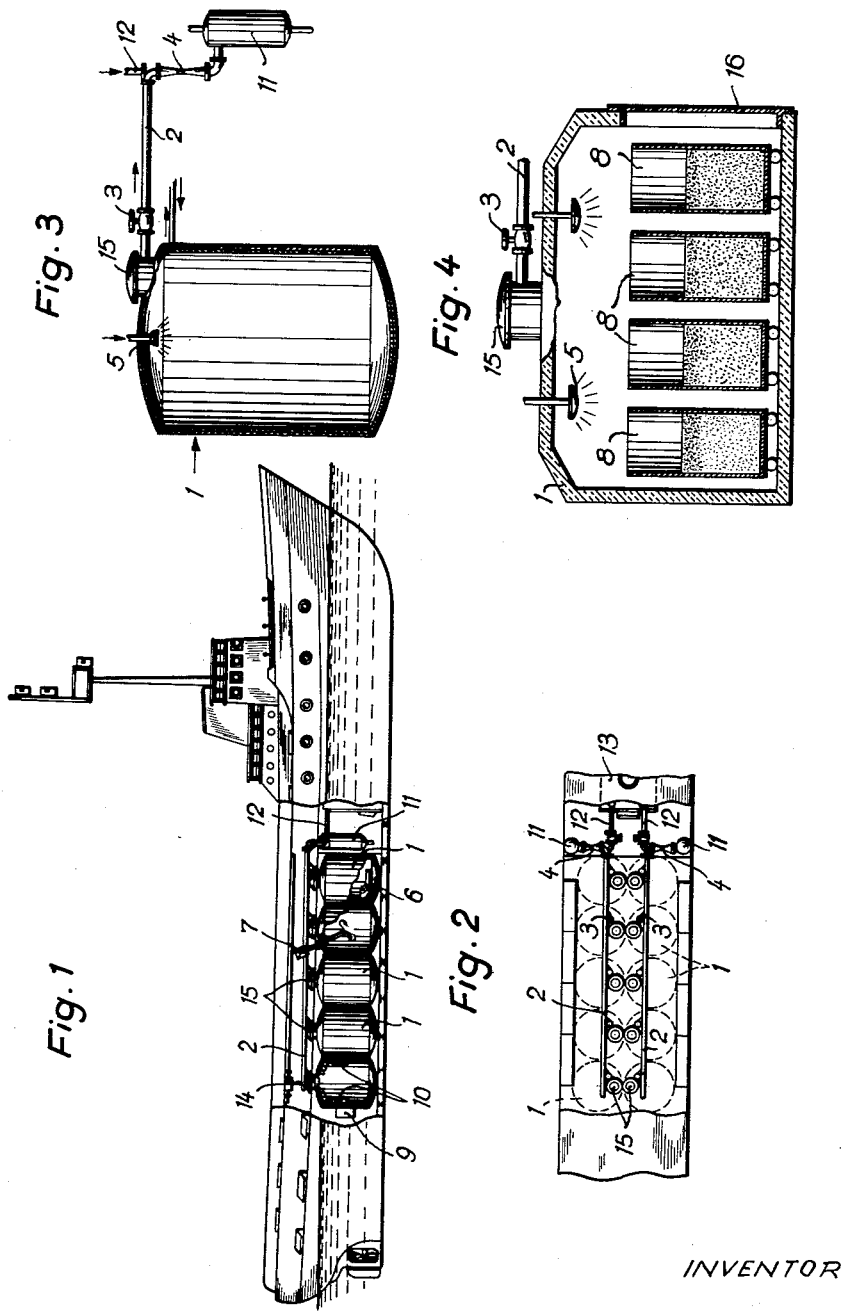

United States Patent Office 2,987,404
   Patented June 6, 1961

2,987,404
   METHOD OF CONSERVING FRESH FISH
   Hans Beckmann, Rutschbahn 7, Hamburg, Germany
   Filed Apr. 11, 1957, Ser. No. 652,139
   Claims priority, application Germany Apr. 13, 1956
   7 Claims. (Cl. 99—195)

This invention relates to a process for conserving and cooling foods, more especially fish, and also to apparatus for carrying such a process into effect. As compared with pickling and sterilisation, the conservation of foods by cooling or refrigeration has the advantage that neither the valuable structural substances, enzymes, ferments and vitamins nor the aromatic substances and the natural colouring substances of the foods are destroyed. For this reason, the refrigeration processes are preferentially employed for the conservation of foods.

Refrigeration and conservation is of particular importance as regards fish, since in contrast to the tissues of warm-blooded animals, the tissues of fish are not sterile. They contain large quantities of seawater bacteria, which in conjunction with the enzymes and ferments develop an intensive decomposing activity immediately after biological death has occurred. The autolytic processes usually proceed with extraordinary rapidity, because the conditions existing on board ship after the fish have been caught only differ to a slight degree from the otherwise natural living conditions. Even if the autolysis initially does not produce any harmful decomposition products, it does however cause the unpleasant and penetrating fish odour due to formation of organic amines, for example trimethyl amine.

It is true that these phenomena can be effectively counteracted if an intensive refrigeration is carried out immediately after the catch is on board. However, this is usually not possible, because the extensive equipment necessary for this purpose cannot be installed on a fishing vessel of present-day size. The fishermen are consequently restricted to adding ice carried on the ship in order that the temperature in the fish hold is at least kept at a tolerable value. The lowering of temperature which is possible by adding ice however, has practically no conserving effect, because it is hardly lowered to an appreciable degree as compared with the normal body temperature of the fish of 4–10° C. Moreover, the oxygen which promotes the development of seawater bacteria and causes the oxidation of the fatty substances has unrestricted access. In addition, pathogenic bacteria find an excellent nutrient medium in the water from melting ice enriched with albumin.

This deterioration taking place at ever increasing speed as a function of time makes it necessary that the return journey of the fishing vessel should be started at the latest 10 days of fishing, so that the fish caught in the first few days do not completely decay. Owing to the time factor the loading capacity of the fishing vessel can usually be used to only 60% of its capacity so that the economy is jeopardized by the high costs of a fishing trip.

After the catches have been landed, it is true that a refrigerating treatment, and usually even a deep-freezing treatment, is carried out with processed fish which are intended for dispatch, but these treatments cannot eliminate the damage which has occurred since the fish were caught.

In order to obviate these difficulties, a very large number of different refrigerating processes have become known; for example, the fish on board a trawler are immediately deep-frozen by means for example of a "Birdseye" apparatus, in which ammonia evaporating between aluminium plates is adapted to circulate. In other processes, tightly closed metal containers are sprayed with low-cooled salt water or are dipped in liquid air. According to another process, the so-called wind tunnel process, the foodstuffs are conducted through a wind tunnel and there subjected to very rapid air impulses from pipes cooled to a low temperature (−40 to −60° C.) with ammonia.

All these deep-freezing processes have the disadvantage that on the one hand very costly refrigeration units have to be employed and un unnecessary expenditure for equipment is necessary for this purpose. Furthermore, deep-freezing in many cases damages the material to be kept fresh, so that it would be expedient only to cool to such a degree as is absolutely necessary. The latter is all the more essential, in that the temperatures, once they are chosen, have to be constantly maintained and thus require the maintenance of the cold conditions until the material to be kept fresh has reached the consumer. This is important, because slight changes in temperature with frozen foods lead to recrystallisation processes within the cells and thus in certain circumstances cause a destruction of the cell structure.

One object of the invention therefore is to improve the quality of conserved food especially fish.

A further object of the invention is to bring forth an improved and simplified method to conserve food especially fish.

Yet another object of the invention is to perform an improved and simplified method to cool fresh, liquid-containing food especially fish.

A further object of the invention is to improve and simplify the storage of food especially fish.

Another object of the invention is to improve and simplify the transport or shipment of cooled food especially fish.

A further object of the invention is to produce simple and effective apparatus for cooling food especially fish.

Another object of the invention is to produce simple and effective apparatus for storing cooled food especially fish.

The foregoing and other objects of the invention are attained in the system illustrated in the accompanying drawings and described below. It is to be understood that the invention is not limited to the specific form thereof shown and described.

The disadvantages referred to are obviated by the process according to the invention because the prepared foods (and more especially fish) are subjected in vacuo to degasification and are thereafter or simultaneously cooled by utilizing the evaporation enthalpy of body surface liquid and/or liquid, in that the prepared foods are subjected to a vacuum in a container which is connected to a suction pump, it being possible for additional liquid, preferably purified fresh or salt water, to be added prior to, or during, the evacuation by suction.

Therefore, the considerable heat of evaporation of the water, which amounts to 583 cal./g. at room temperature, is used for cooling the food which is to be kept fresh, in that the evaporation of the water is produced by applying a high vacuum.

Since the heat of evaporation of the water at 0° C. is somewhat greater than at room temperature, namely 597 cal./g., an even better effect is obtained when fresh or salt water ice is added to the food to be conserved in the containers.

A process according to the invention will now be described with reference to the accompanying drawings, wherein:

FIG. 1 is an elevation, partly in section, of a fishing vessel which is equipped with the means according to the invention for carrying the process into effect.

FIG. 2 is a plan view of a part of the fishing vessel shown in FIG. 1,

FIG. 3 shows a treatment tank with the pump assembly connected thereto which forms apart of the vessel of FIG. 1, FIG. 4 is a cross-section similar to FIG. 3 of a modified form of treatment tank, FIG. 5 is a cross-section through a processing and storage building incorporating equipment according to the invention, and FIG. 6 is a plan view, partly in section, of the building shown in FIG. 5.

The process according to the invention is based on the following biological and physical principles; the fish must be killed immediately after being caught, since otherwise the autolytic processes are strongly assisted by a slow dying process. Furthermore, the treatment according to the invention must be carried out before loosening of the rigor mortis, that is to say, within 4-6 hours. Furthermore, the fish must be deaerated and de-gasified, after possibly carrying out the gutting operation. By this means, the absorption of those gases which promote the decomposition process is prevented. Furthermore, there is also removed thereby the oxygen which promotes the development of seawater bacteria, and oxidation processes within the cells are prevented. Furthermore, with the process according to the invention, the temperature is required to be lowered only to such a degree that the body cell contents and the intercellular liquid do not freeze, whereby damage to the tissue due to ice crystals is avoided, and finally it is necessary with the present process to cool the fish as far as possible uniformly to about $-1°$ C. and constantly to maintain this temperature and prevent further access of air so that the decomposition processes are prevented or sufficiently retarded.

The manner is which the process is carried into effect technically will hereinafter be described in detail. After being caught, the fish are immediately killed, gutted if necessary and carefully washed. The fish thus prepared are placed in a tank 1, which is preferably of cylindrical construction and can be closed in air-tight manner. The fish are subjected to the treatment according to the invention inside the said tank.

These vacuum tanks can be made of double-wall construction to avoid heat radiations, the space between the inner and outer walls being evacuated or cooled or provided with an insulating material, so that convection of heat from outside is prevented. It is merely the very small heat quantities occurring due to radiation which are to be intercepted. With the temperature differences occurring in practice, these radiations can be maintained by suitable measures at about 5 thousand calories per square metre per hour. It is however quite possible to minimise these radiations by placing a spiral coil lined with metal foils around the inner tank or in the space between the two nested tanks, the said coil being connected to a refrigerator of very low capacity.

In one form of the invention, the tanks have a capacity of 50 tons. It is however possible for the tanks to be of such dimensions that they can be hoisted out of the fishing vessel after berthing, is necessary placed on trucks and immediately stored or transported. The tanks can be so arranged in the hold of the ship that six to eight tanks are juxtaposed in two rows, the covers 15 of the separate tanks appearing as hatches through the deck.

All tanks 1 are connected by way of shut-off valves 3 to a main piping system 2, which leads to a steam jet pump 4. This steam jet pump is preferably situated in the engine room of the ship and is supplied through the pipes 12 with live or waste steam. By means of this pump the gaseous constituents, mainly air, are evacuated from the tank and thus from the bodies of the fish, the vacuum in the tank finally reaching a pressure of 2 mm. mercury column.

The tank is provided with a water injection device 5 and can, in addition, also comprise a pump 6 or a stirrer mechanism 7, these two devices being provided to prevent the formation of a solid ice crust and in addition increase the flow velocity and thus the heat transfer by convection.

It is also possible for the vacuum tanks to be so constructed that small separate vessels 8, for example wire baskets or trucks (FIG. 4) are arranged in the tanks and can be introduced or removed through an opening 16.

In addition, cooling coils 10 of a refrigeration plant 9 can be arranged in the tank 1.

After a catch has been prepared in the manner indicated above, the cover 15 of the vacuum tank 1 is opened and the fish is introduced. After closing the tank and opening the shut-off valve 3 leading to the main suction pipe, the tank is connected to the steam jet pump 4. Within a short time, air and gases are removed from the tank and from the fish by the pump, so that a very high vacuum is set up.

With a pressure of 2 mm. mercury column, the water adhering to the fish is immediately evaporated at a temperature down to $-10°$ C. In consideration of the considerable heat of evaporation or evaporation enthalpy of the water or of the aqueous liquids, the fish is cooled. A thin layer of ice is formed, which is immediately liquefied again by the heat subsequently flowing from the bodies of the fish, so that the evaporation process can proceed without interruption. By choice of a suitable vacuum, this process can be largely adapted to prevailing conditions. Since the cold is generated directly, i.e. without intermediate carrier, on the body of the fish, there is produced an intensive cooling of the fish within a shortest possible time.

After evaporation of the externally adhering water, which process only takes a few minutes, further water is supplied through the water supply or spray device 5 and the contents of the tank are superficially wetted. The water supplied can be salt or fresh water, but filtered seawater is usually preferred. The evaporation process is continued until the fish have been cooled down to the required temperature, which is about $-1°$ C.

In order to simplify the process, the total catch of fish brought inboard can also be flooded with seawater. The de-gasification and cooling then proceeds in exactly the same manner, but now the heat is extracted from the fish not directly, but by means of convection. With this somewhat simplified process, it is however necessary to take care that a continuous area of ice is not formed at the surface. Such a covering of ice would counteract the evaporation of the water and would thus make the cooling difficult. In order to prevent this, the tank 1 can be equipped with the stirrer mechanism 7 or the pump 6, so that the liquid is circulated during the treatment. By selecting a predetermined vacuum, any desired degree of coldness can be achieved.

The flooding of the fish with water has the advantage that owing to the buoyancy, the pressure obtaining inside the heap of fish is largely reduced, so that pressure zones and damage to the fish to be preserved are avoided.

For further accelerating the process and for increasing the value of the heat of evaporation of the water, it has proved to be advantageous to add fresh or seawater ice to the fish in the tanks. It has proved desirable in such cases to add ice in an amount of approximately 10% of the weight of fish. It has also been found to be advantageous in this case that the free flow of the water between the fish by means of a pump 6 or stirrer mechanism 7 should be assisted by a forced circulation.

A single filling or repeated filling can be carried out, depending on the size of the tank. For example, large tanks holding 50 tons can be charged four times before they are completely filled. The tanks are then left without any special supervision, except that the temperature and the vacuum are checked at intervals. The regulation of these variables can also be effected automatically.

The vacuum tanks 1 can also be made smaller so that it is possible, after the ship has berthed, for the tanks, to be lifted out of the ship so as to be set down on trucks, so that they can thereafter be stored or transported. It is however also possible to use even smaller separate containers 8 which can be easily carried by hand. In this case, the treatment is carried out as follows:

The separate containers 8, which are in the form of wire baskets or of rectangular vessels which are open at the top, are introduced into a large vacuum tank 1. After closing the cover 15 or the entrance door 16 (Fig. 4), the de-gasification, deaeration and evacuation is carried out in the manner set forth above.

After reaching the vacuum necessary for operational purposes, water is introduced into the tanks so that the spaces between the fish are filled. By the strong cooling action, this water is partially or completely changed into ice. The evacuation is continued until a continuous layer of ice has formed on the surface of the separate container 8—this layer prevents any access of air. Depending on the size of the tank 1 and the vessels 8, and also depending on circumstances, this icing lasts approximately 5–10 minutes. Thereafter, these separate containers 8 can either remain in the vacuum tank 1 or can be stored in a separate fish hold or a larger tank, it being necessary to keep the ambient temperature at −1° C. in order to prevent thawing. By this means, the same effect is obtained as in the previous process with large tanks, but the handling operations with the previous processes is somewhat more complicated and time-consuming. In contradistinction thereto the fish to be conserved are packed, according to the present invention, in smaller quantities, this being perhaps an advantage on berthing.

The cold vapours formed during evacuation of the tank can be immediately extracted through the steam jet pump 4 and deposited in a condensor 11 connected on the output side. It is however also possible, and even advantageous, for the cold vapours to be deposited as ice on a cooler situated inside the tank or on cooling coils 10 of a refrigerating plant 9. This method leads to the same result, but with the difference that the ice formed on the cooling coils 10 can be broken off and falls into the tank 1. By this means, a supplementary ice reserve is provided for transport purposes and this method is more advantageous from an economic point of view.

The fish treated by this process are of first-class quality. After landing, they can be stored and transported in the tanks of the type previously described. In the case where a processing stage is provided, for example filleting, deep-freezing or the like, the products are stored and transported in the same tanks, the energy consumption even at temperatures of −20° then being infinitesimally small.

In detail, when the fish are stored with the use of the vacuum tanks according to the invention, the process hereinafter described by reference to Figs. 5 and 6 is employed. The foods, for example fish, arriving in the tanks or also in other ways, are prepared in the ground floor 18 of a processing and storage building. They are filleted in a filleting machine 24 and thereafter packed at a packing station 25. The fish then reach a deep-freezing apparatus 26, where they are cooled to the necessary temperature. From the latter, the deep-frozen and fully prepared and packed fish are stored in vacuum tanks 1. These vacuum tanks for storage purposes are similar to the tanks previously mentioned, but they are preferably of smaller size, namely 15 tons.

The filled vacuum tanks 1 are closed and conveyed into a storage room 19. For easier manipulation, the tanks 1 are mounted on undercarriages 17, so that they can be brought (while on said undercarriages) to their storage position by movement on rails 20 and turntables 21.

It has proved to be desirable that the celler of building 18 should be used as storage room. In this way, the landed fish are most expediently processed in a continuous working operation.

The vacuum tanks can be evacuated in the storage room 19 or even directly after leaving the deep-freezing station 26. Transportation of the tanks from the processing floor 18 to the storage room 19 can be effected by hoists or lifts 22.

Due to the provision of vacuum storage tanks which are of double-walled construction, there is no longer any appreciable exchange of heat between the cooled fish and the outside air. In order to compensate for any heat losses which may occur, it is possible to provide the previously mentioned refrigerating plants 9 on the storage tank 1. The fish in these vacuum tanks can be stored for relatively long periods of time.

The transport of the fish from the processing and storage building to the wholesaler is preferably also carried out in these vacuum tanks 1. For this reason, the tanks are of such dimensions that they can be loaded without any difficulty on railway trucks 23 or other means of transport. When using tanks with a capacity of approximately 15 tons, 3 of these tanks can, for example, be conveniently arranged on one truck. If it is desired that the fish in the tank should be further cooled while it is being transported, the refrigerating plant 9 can for example be supplied by a small generator which is arranged on the axles of the truck.

By using such vacuum tanks, it is possible to dispense with the use of special refrigerator trucks, and in addition the previous storage of the deep-frozen material, as previously mentioned, can now also take place in the cellars of warehouses. This storage in cellars could not hitherto always be carried out, since the storage of deep-frozen articles therein or the low cooling of the cellar itself could only be achieved with heavy expense for insulating material. If such a cellar, usually a damp cellar, is used as refrigeration room, damage to the concrete wall of the cellar occurs in a comparatively short time, the moisture in the cellar wall causes the latter to crack due to freezing.

The present process operates with less initial outlay and in a considerably more economic manner than the prior known processes and is of particular importance for use in tropical zones.

Owing to the better quality of the fish, a substantially higher profit is made from the catch and the loading capacity of the ships, which hitherto could generally be utilised only to 60% capacity is increased to 90–100% owing to the fact that the ships can remain for a longer period in the fishing zone and to the saving of storage space, the latter because the carrying of ice can be completely dispensed with or very considerably restricted.

It is obvious that the process which has been described can be used in connection with other foods, which are to be de-gasified and cooled in a corresponding manner for conservation purposes.

What I claim is:

1. In a method for the conservation of fresh fish before loosening of rigor mortis, the steps of storing said fish in a sealable container, subjecting said container to a vacuum in order to de-gasify and de-aerate said fish and to cool said fish to a degree such that the body cell contents and the intercellular liquid do not freeze, and maintaining said vacuum as long as conservation is desired.

2. In a method for the conservation of fresh fish before loosening of rigor mortis, the steps of moistening the surface of said fish with water liquid, storing said fish in a sealable container, subjecting said container to a vacuum in order to de-gasify and de-aerate said fish and to cool said fish to a degree such that the body cell contents and the intercellular liquid do not freeze by evaporating the liquid existent thereupon, and maintaining said vacuum as long as conservation is desired.

3. In a method for the conservation of fresh fish before loosening of rigor mortis, the steps of moistening the surface of said fish with water liquid, storing said moistened fish in a sealable container, subjecting said container to a vacuum in order to de-gasify and de-aerate said fish and to cool said fish to about −1° C. by evaporating said liquid, and maintaining said vacuum as long as conservation is desired.

4. In a method for the conservation of fresh fish before loosening of rigor mortis, the steps of storing said fish in a sealable container, subjecting said container to a vacuum of about a two millimeter mercury column absolute pressure in order to de-gasify and de-aerate said fish and to cool said fish to a degree such that the body cell contents and the intercellular liquid do not freeze, and maintaining said vacuum as long as conservation is desired.

5. In a method for the conservation of fresh fish before loosening of rigor mortis, the steps of storing said fish in a sealable container, introducing water into said container, subjecting said container to a vacuum in order to de-gasify and de-aerate said fish and to cool said fish to a degree such that the body cell contents and the intercellular liquid do not freeze by evaporating a part of said water, and maintaining said vacuum as long as conservation is desired.

6. In a method for the conservation of fresh fish before loosening of rigor mortis, the steps of moistening said fish with water liquid, storing said moistened fish in a sealable container, subjecting said container to a vacuum in order to de-gasify and de-aerate said fish and to cool said fish to a degree such that the body cell contents and the intercellular liquid do not freeze by evaporating a part of said water liquid, agitating said food within said container, and maintaining said vacuum as long as conservation is desired.

7. In a method for the conservation of fresh fish having a moist surface before loosening of rigor mortis, the steps of storing said fish in a sealable container, subjecting said container to a vacuum in order to de-gasify and de-aerate said fish and to cool said fish to a degree such that the body cell contents and the intercellular liquid do not freeze by evaporating said surface moisture, maintaining said vacuum as long as conservation is desired, removing said fish from said container, deep-freezing said fish, returning said fish to said container, and continuing and maintaining said vacuum in said container as long as conservation of said deep-frozen fish is desired.

References Cited in the file of this patent

UNITED STATES PATENTS

| | | |
|---|---|---|
| 1,888,133 | Kronquest | Nov. 15, 1932 |
| 1,910,009 | Grayson | May 23, 1933 |
| 1,938,522 | Grayson | Dec. 5, 1933 |
| 2,344,151 | Kasser | Mar. 14, 1944 |
| 2,402,121 | Brewster et al. | June 18, 1946 |
| 2,546,428 | Byrd | Mar. 27, 1951 |
| 2,623,826 | Grinstead | Dec. 30, 1952 |
| 2,684,907 | Brunsing | July 27, 1954 |
| 2,745,756 | Ruff | May 15, 1956 |
| 2,832,690 | Brunsing et al. | Apr. 29, 1958 |